June 10, 1930.   A. C. SCHICKLER   1,762,197
LIQUID TRAP FOR REFRIGERATING SYSTEMS
Original Filed June 30, 1927

Inventor
Albert C. Schickler
By Brackett & Hyde
Attorneys

Patented June 10, 1930

1,762,197

UNITED STATES PATENT OFFICE

ALBERT C. SCHICKLER, OF CLEVELAND, OHIO, ASSIGNOR TO EDMUND E. ALLYNE, OF CLEVELAND, OHIO

LIQUID TRAP FOR REFRIGERATING SYSTEMS

Original application filed June 30, 1927, Serial No. 202,724. Divided and this application filed June 30, 1927. Serial No. 202,725.

This invention relates to liquid traps for refrigerating systems, such traps as are used for controlling the flow of the refrigerant, either liquid or gas or both, through the circulating or transmitting conduits. This application is a division of my application for refrigerating system filed of even date herewith, Ser. No. 202,724.

Broadly speaking the invention provides an improved form of trap of the liquid seal type constructed and arranged to permit practically unimpeded flow in one direction and to prevent flow in the other direction by a resistance depending upon the proportions and arrangements of the liquid seal and the legs of sealing liquid produced therein under varying conditions.

The object of the present invention is to provide an improved trap of this kind which reduces the tendency of the moving refrigerant to blow, sweep or spray the sealing liquid bodily out of the trap and thereby to displace it from its proper place in the system and interfere with proper action.

A further object is to provide a trap in which the ports, passages and chambers are so arranged as to limit the rate of flow of the refrigerant through the trap and therefore control its possible effect upon the sealing liquid, and particularly to control the flow by balancing the pressures of different portions of the sealing liquid in one leg, so that its escape from the apparatus is prevented.

Further objects of the invention are in part obvious and in part will appear more in detail hereinafter.

Figure 1:
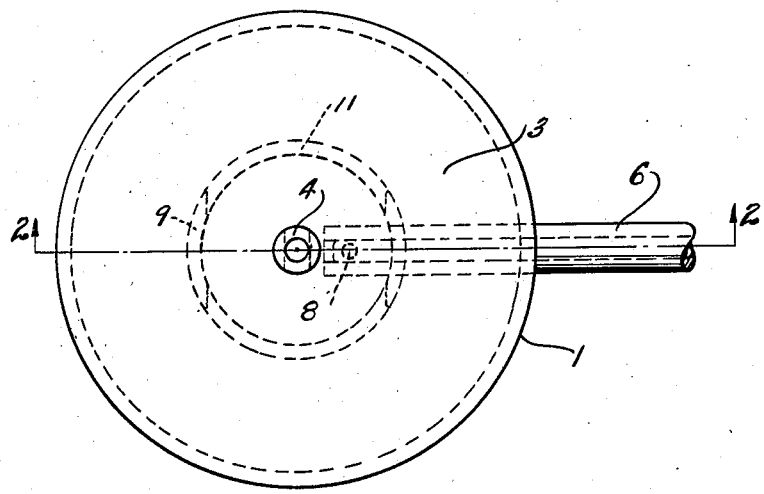
Figure 2:
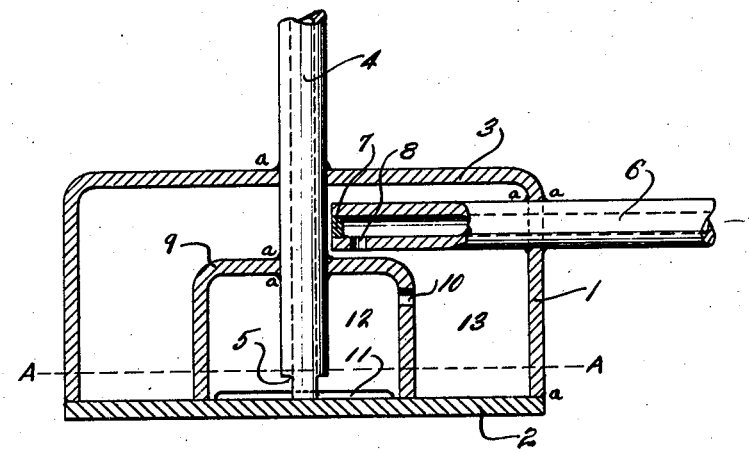
Figure 3:
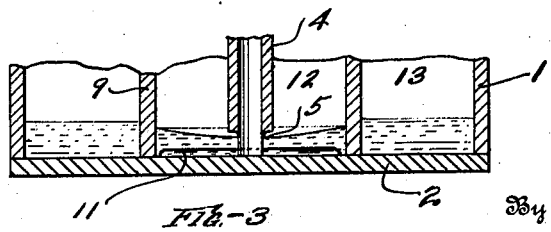

In the drawings, which represent one suitable embodiment of the invention, Fig. 1 is a plan view; Fig. 2 is a sectional elevation on the line 2—2, Fig. 1; and Fig. 3 is a similar view illustrating the effect on the sealing liquid.

The liquid trap shown for purposes of illustration in the drawings comprises an outer shell or casing 1 of cylindrical form in plan view having a bottom 2 and a top 3. An inlet conducting pipe 4 is led into the center of the top and extends to the bottom 2, which it may abut for purposes of support, if necessary. Near its lower end said inlet pipe is provided with one or more lateral ports or openings 5 formed, for example, by cutting away opposite sides of the pipe to provide the two openings shown. The outlet pipe 6 enters the side wall of the casing and extends radially into its chamber into close neighboring relation with the pipe 4. The inner end of pipe 6 is closed by a cross wall 7 and it is provided in its side, near the pipe 4, with a lateral port 8, which lies just above an inner dome 9 of inverted cup shape similar to the shell 1 and concentric therewith. The upper wall of said dome is spaced slightly below the pipe 6 so as to shield or baffle access to the port 8 thereof, and the side wall of the dome is provided with a port 10, while its lower edge, where it meets the bottom 2 of the shell is provided with shallow openings or recesses 11, formed by slotting or recessing the edges of the dome wall.

The joints of the metal are sealed, such as by a welding or brazing operation, at the several points marked $a$, so that the only access to and from the cavities and chambers within the trap is through the passages in the two conduits 4, 6. Conduit 4 is the one by which the refrigerant is conducted to the trap, while the pipe 6 is the outlet. These two pipes are of relatively small dimensions, say $\frac{3}{16}''$ inside diameter, and are usually of like size. The ports or openings 8 and 10 are also relatively small and are of approximately the same diameter. In any event, port 10 is at least as large as the port 8.

Within the casing is placed a quantity of suitable sealing liquid which may be any material answering to the description of the sealing liquids referred to in my prior applications for refrigerating apparatus, Ser. Nos. 144,461 and 148,501, filed October 27, 1926 and November 15, 1926, respectively. One material suitable for the purpose is mercury. A quantity of mercury is inserted into the trap at the time of its assembly in a refrigerating system, such as by introducing it through one or the other of the conduits 4 or 6. This mercury is introduced in a carefully measured quantity depending upon the size and proportions of the parts and the amount of resistance desired to be offered to flow in one direction, to wit, from pipe 6 toward pipe 4. Attempted flow in this direction, it will be seen, raises a mercury column in the pipe 4 and the height of said column depends largely upon the total quantity of mercury in the trap. The normal level of mercury, indicated at A, Fig. 2, is slightly above the upper edges of the ports or openings 5 in the pipe 4, so that said ports or openings, as well as the ports 11 in the dome 9, are normally completely submerged in the mercury, which finds the same level in the central passage in conduit 4, in the co-axial chamber 12 within the dome 9 and in the annular chamber 13 in the outer shell outside of the dome.

This arrangement is essentially a U-tube with one column or leg of mercury in the pipe 4 surmounted by the pressure of the gas or liquid above it and another leg of mercury in the chambers 12, 13 surmounted by the pressure of the gas or liquid in said chambers and in the passage of the conduit 6. Upon any differential of pressure in either direction one mercury leg is depressed and the other rises. It will be obvious that if the pressure in pipe 4 becomes greater than the pressure in pipe 6 the mercury leg in pipe 4 is depressed until its upper surface is pushed down beneath the edges of the orifices 5, whereupon gas or liquid, as the case may be, flows from pipe 4 through the orifices 5 into the chamber 12. Such flow displaces a relatively small quantity of mercury, to wit, a volume of mercury having the same cross sectional area as the channel in pipe 4 and a height equal to the difference in level between the level A and the upper edges of the orifices 5. This small quantity of mercury when forced over into the chambers 12 and 13 does not materially raise the level of mercury therein, due to their large area. As a consequence a very slight differential of pressure of the pipe 4 over the pipe 6 will permit flow in the direction stated and the trap can be adjusted to offer practically no resistance to flow in this direction. However, if the pressure in the pipe 6 rises above that in pipe 4, or if the pressure in pipe 4 falls, the leg of mercury in chambers 12 and 13 is depressed and the leg of mercury in the pipe 4 rises. In this case, however, the cross sectional areas of the two legs of mercury are so widely different that the same very small depression of the mercury in chambers 12, 13 produces a very material rise of mercury in pipe 4, even to a height of four to eight feet if desired, and the quantity of mercury initially installed in the trap may be so chosen as to produce a sufficiently high leg in pipe 4 to practically absolutely prevent any flow backwardly from pipe 6 to pipe 4 at the differentials of pressure that are encountered in normal or even abnormal operation of the system in which the trap is installed.

One important feature of the present invention is the arrangement to prevent any rush of gas or liquid through the trap to pipe 6 from sweeping or blowing or spraying the mercury out of the trap. The arrangement of the parts is such that if the trap is physically turned upside down the mercury, seeking its level at all times, follows the walls of the chambers and finds no escape to either of the pipes 4 or 6, according to the principles of my prior applications referred to. Even when the trap is completely inverted the mercury level will not reach the port 8 and cannot flow into the pipe 6. Moreover, as the gas or liquid flows from pipe 4 through the ports 5, it enters chamber 12, from which it issues into chamber 13 through the small port 10. This arrangement limits the rate of exit from chamber 13 to the rate of entrance thereto. Therefore, no violent effect is produced, such as would be possible if the mercury could sweep into a single chamber and thence blow freely out through an exit to the pipe 6. With this latter arrangement the violence of the passage of the gas sometimes seems to vaporize or so finely divide the mercury as to spray it bodily out through the pipe 6, but the equalization of pressures in chambers 12 and 13 during passage of gas through the trap avoids disturbance of the mercury and insures its retention in its proper operating position.

Moreover, it is apparent that when the pressure in pipe 4 preponderates over that in pipe 6 the first bubble of gas enters chamber 12 by bubbling up through the mercury. The first effect of this entering gas is to very slightly increase the pressure in chamber 12 over that in chamber 13, which has a tendency to depress the mercury in chamber 12 and elevate it in chamber 13. While, of course, we are dealing with very small dimensions, which are exaggerated in Fig. 3 for simplicity of illustration, the net effect seems to be to depress the surface of the liquid in chamber 12 into somewhat saucer shape, completely exposing the openings 5 and permitting the gas to flow into chamber 12 in a steady stream instead of as a succession of bubbles. The operation is therefore more quiet and the mercury is left more or less quiescent, merely shifting the level of different portions of its upper surface with variations in pressure conditions.

In my co-pending application of which this is a division, the invention has been described as used in an absorption type refrigerating apparatus. However, it is obvious that it is useful in refrigerating systems of other types and in fact in any place where it is desired to limit or control the passage of gas or liquid so that its flow in one direction is either resisted to a greater extent than in the other direction or in fact may be practically stopped.

What I claim is:

1. A liquid trap of the kind described, comprising a hollow shell provided with an entrance pipe opening into its lower portion, a hollow dome dividing the cavity in said shell into two chambers communicating at a low level, said dome being provided with a vent, and an exit pipe communicating with the outer chamber.

2. A liquid trap of the kind described, comprising a hollow shell provided with two chambers communicating near their bottoms, an entrance pipe communicating with one chamber, an exit pipe communicating with the other chamber, and means for equalizing the pressures in said two chambers.

3. A device for controlling the flow of refrigerant in refrigerating systems, comprising two chambers containing a sealing liquid and communicating with each other both above and below the normal level of the surface of said liquid an entrance conduit communicating with one chamber below said level, and an exit conduit communicating with the other chamber.

4. A device for controlling the flow of refrigerant in refrigerating systems, comprising two chambers containing a sealing liquid and communicating with each other below the normal level of the surface of said liquid and provided with a communicating port between them above said level, an entrance conduit communicating with one chamber below said level, and an exit conduit having a supply port no larger than said first named port and communicating with the other chamber.

In testimony whereof I hereby affix my signature.

ALBERT C. SCHICKLER.